Jan. 2, 1968   H. PÖHLER   3,361,500
ANTIFRICTION BEARING
Filed July 16, 1965   2 Sheets-Sheet 1

INVENTOR
Heinz PÖHLER

BY
Michael J. Striker
his ATTORNEY

United States Patent Office 3,361,500
Patented Jan. 2, 1968

3,361,500
ANTIFRICTION BEARING
Heinz Pöhler, Westhofen uber Schwerte, Germany, assignor to Eisenwerk Rothe Erde G.m.b.H., Dortmund, Germany
Filed July 16, 1965, Ser. No. 472,618
Claims priority, application Germany, July 22, 1964, E 27,456
5 Claims. (Cl. 308—216)

ABSTRACT OF THE DISCLOSURE

An antifriction bearing wherein a pair of coaxial races have adjoining annular faces each provided with a concentric annular groove. An annular wearing strip is provided in each of these grooves and at least one such strip is angularly movable with reference to the race with which it is associated. Rolling elements are provided between the wearing strips.

Figure 1:
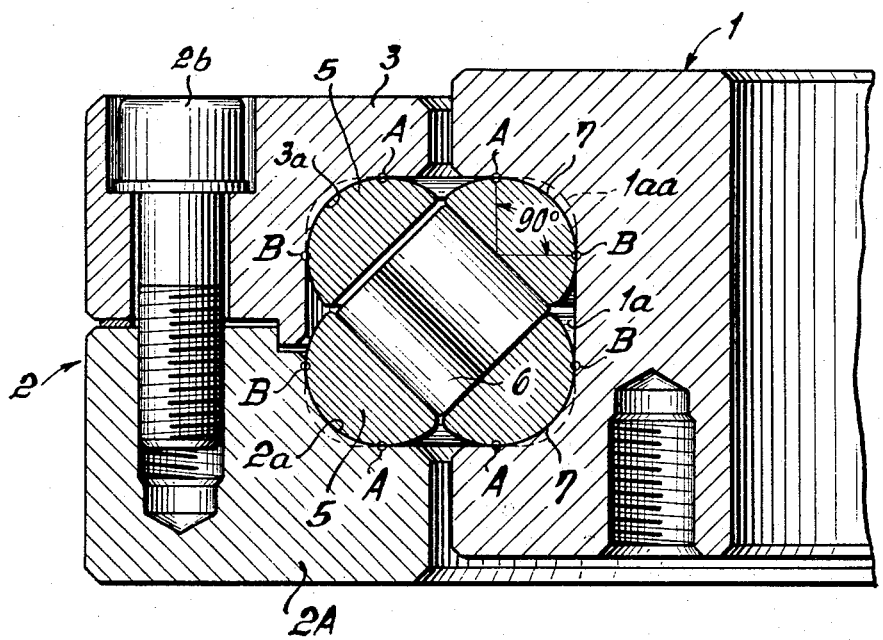

The present invention relates to antifriction bearings in general, and more particularly to antifriction bearings of the type wherein the rolling elements travel between so-called wearing strips or liners which are recessed into the races of the bearing.

It is already known to provide each race of an antifriction bearing with one or more wearing strips of triangular, rectangular or other polygonal cross-sectional outline. The wearing strips define raceways for the rolling elements but are likely to wear away very rapidly if the rolling elements are inserted with some play and/or when all component parts of the bearing are not finished with utmost precision. Such rapid wear of polygonal wearing strips is due to the fact that they are firmly embedded in the corresponding races and cannot follow angular displacements of cylindrical or other non-spherical rolling elements. In order to overcome such drawbacks of conventional wearing strips, the bearing is often provided with spherical or partly spherical rolling elements or with spherical raceways for the rolling elements; however, such bearings cannot transmit high loads because the rolling elements are in mere point contact with the wearing strips.

Accordingly, it is an important object of the present invention to provide a very simple, wear-resistant and easy-to-assemble antifriction bearing of the type wherein the rolling elements travel in raceways defined by two or more wearing strips and to construct the wearing strips in such a way that each thereof can readily follow at least some angular displacements of cylindrical or other types of nonspherical rolling elements.

Another object of the invention is to provide an antifriction bearing of the just outlined characteristics wherein the wearing elements automatically find optimum positions of engagement with the rolling elements and with the corresponding races.

A further object of the invention is to provide improved wearing strips for use in axial or other types of antifriction bearings.

An additional object of the invention is to provide an antifriction bearing with wearing strips which invariably remain in full linear contact with each rolling element and which are much less likely to wear away than the strips which are used in conventional antifriction bearings.

Briefly stated, an important feature of my invention resides in the provision of an antifriction bearing comprising two annular races having adjacent but spaced annular faces each of which is provided with a concentric annular groove, an annular wearing strip angularly movably (turnably) received in each groove, and a series of cylindrical rolling elements received between and in linear contact with each wearing strip. The wearing strips will change their angular positions with reference to the corresponding races to follow changes in angular position of the rolling elements.

In accordance with a more specific feature of my invention, each wearing strip has an outer surface of substantially semicircular cross-sectional outline which is received in the corresponding groove in such a way that the wearing strips engage the respective races along lines which are spaced through 90 degrees from each other, and each wearing strip has a flat annular inner surface which is engaged by the peripheries of the rolling elements. The wearing strips may be inserted into grooves provided in the end faces of two coaxial races which are mounted end-to-end. Alternatively, one of the wearing strips may be disposed in a circumferential groove provided in the peripheral face of an inner race and the other wearing strip is inserted into a groove machined in the internal face of an outer face. In some instances, the bearing may comprise a pair of wearing strips only one of which is free to change its angular position with reference to the corresponding race.

Figure 2:
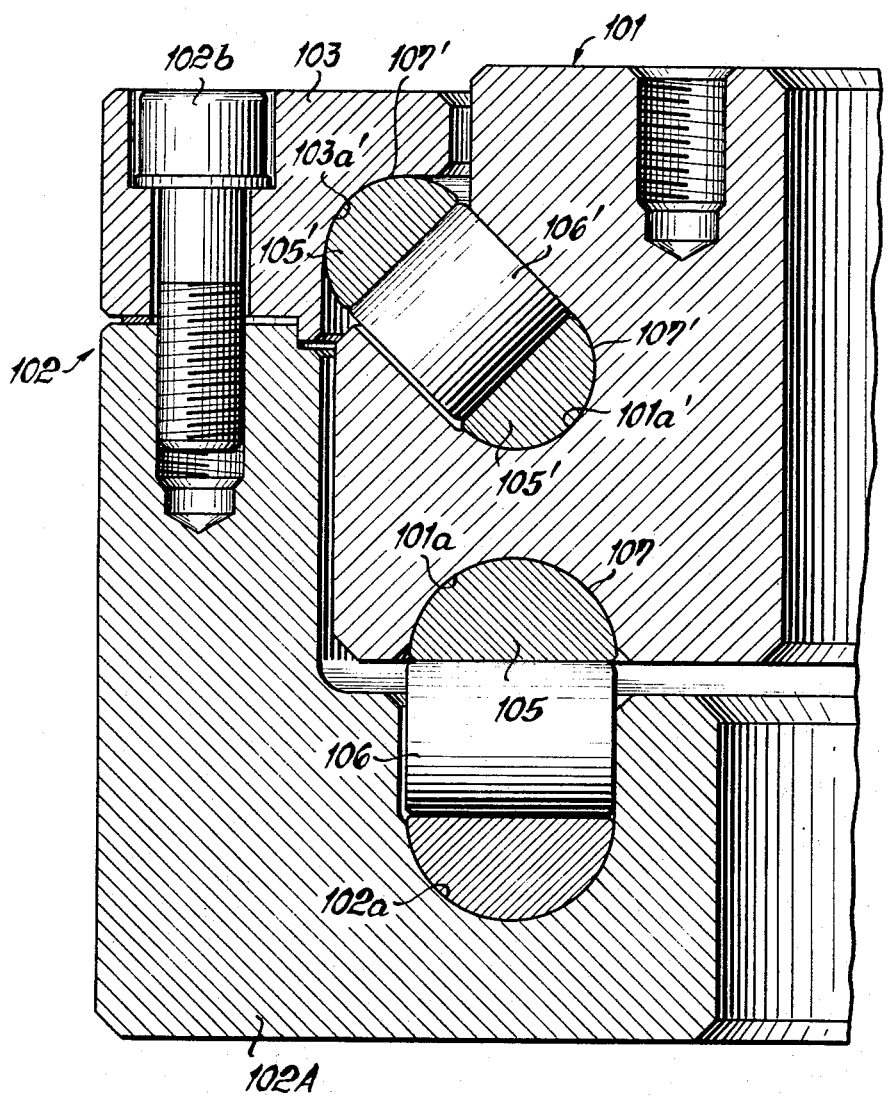

Thte novel features which are considered as characteristic of the invention are set forth in particular in the appended claims. The improved antifriction bearing itself, however, both as to its construction and the mode of assembling the same, together with additional features and advantages thereof, will be best understood upon perusal of the following detailed description of certain specific embodiments with reference to the accompanying drawings, in which:

FIG. 1 is a fragmentary axial section through a roller bearing with angular contact which embodies one form of my invention; and FIG. 2 is a similar fragmentary axial section through a duplex roller bearing which is constructed in accordance with a second embodiment of my invention.

Referring first to FIG. 1, there is shown a combination radial and axial antifriction bearing of the type known as angular contact bearing. This bearing comprises an annular inner race 1, a two-piece outer race 2 having rings 2A, 3 connected to each other by screws or bolts 2b, a series of annularly arranged cylindrical rollers 6 whose axes are inclined with reference to the common axis of the races, and four specially designed and specially mounted annular wearing strips 5, also called liners or inserts, which define a raceway for the rollers 6. Each liner 5 has a flat inner surface which is adjacent to or in actual contact with the rollers 6 and a convex outer surface 7 which is received in a complementary groove 1a, 2a or 3a provided in the adjoining annular face of the corresponding race. The arrangement is such that the outer surfaces 7 contact the respective races along lines A and B which are angularly spaced through 90 degrees with reference to each other to make sure the liners 5 are of the self-aligning type and automatically find an optimum position for transmission of loads. The broken line 1aa indicates the actual configuration of the surface bounding the groove 1a between the lines A and B at which the inner race 1 contacts the upper right-hand liner 5. The difference between the actual outline and the ideal outline of the surface bounding the groove 1a has been exaggerated for the sake of clarity. In the embodiment of FIG. 1, the liners 5 are of semicircular cross-sectional outline, i.e., the outline of each outer surface 7 corresponds to one-half of a complete circle. The peripheral face of the inner race 1 has a single groove 1a which is of rectangular cross-sectional outline with rounded (convex) corner portions. The groove in the internal surface of the outer race 2 consists of two sections 2a, 3a which together form a composite groove that is mirror symmetrical to the groove 1a.

It is immaterial whether the outer race 2 rotates with reference to the inner race 1, whether the inner race 1 rotates with reference to the outer race 2, or whether the two races rotate with reference to each other in the same direction but at different speeds or in opposite directions.

The liners 5 replace conventional liners of triangular cross-sectional outline. Such conventional liners are likely to wear out after relatively short periods of actual use, especially if the rolling elements are inserted with some play or when the component parts of the bearing are not machined with requisite precision. The wear on conventional liners is due mainly to the provision of sharp corners or edges with prevent angular displacements of the liners. Therefore, the rollers will deform the raceway which results in rapid destruction of the bearing.

The liners 5 of my improved antifriction bearing can change their angular positions with reference to the respective races and, therefore, the raceway defined by their inner surfaces remains intact even if the rolling elements 6 have a certain freedom of angular displacement with reference to the liners. The improved bearing is of particular advantage for such applications wherein the rolling elements and their liners should remain in linear contact with each other so that the bearing can transmit substantial loads. However, my invention can be utilized in bearings which comprise spherical, concave or tapered rolling elements, as long as at least one of the liners is free to turn with reference to the corresponding race.

FIG. 2 shows a duplex antifriction bearing having a first annular race 101 and a second annular race 102 including a flanged ring 102A and a retainer ring 103 secured to the ring 102A by bolts or screws 102b. The lower annular end face of the race 101, as the parts appear in FIG. 2, is provided with a concentric annular groove 101a of concave (semicircular) cross-sectional outline to receive a first annular liner 105. A second annular liner 105 is recessed into the bottom zone of a groove 102a provided in the upper annular end face of the ring 102A. Cylindrical rollers 106 are arranged in an annular group which is disposed between the flat inner surfaces of the liners 105 to transmit axial loads. The liners have convex (semicircular) outer surfaces 107. A second group of cylindrical rollers 106' is disposed between two additional liners 105' which are received in grooves 101a', 103a' respectively provided in the peripheral face of the race 101 and in the internal face of the ring 103. The axes of the rollers 106' are inclined with reference to the axis of the bearing.

The outer surfaces 107' of the liners 105' are of convex (semicircular) cross-sectional outline so that each liner is free to change its angular position in the respective groove. Thus, even if the rollers 106, 106' are inserted with some play, they cannot destroy their raceways because the liners 105, 105' will follow the changes in angular position of the rollers.

The liners 105, 105' replace conventional liners of rectanguar cross section. Such rectangular liners are disclosed, for example, in U.S. Patent No. 2,220,027 to Scott and will wear away very rapidly if they are to guide loosely mounted cylindrical rolling elements.

Without further analysis, the foregoing will so fully reveal the gist of the present invention that others can, by applying current knowledge, readily adapt it for various applications without omitting features which fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. An antifriction bearing, comprising a pair of adjoining annular faces; a pair of annular wearing strips concentric with said races and having outer surfaces of substantially semicircular cross-sectional outline extending into complementary grooves provided in said annular faces so that each of said wearing strips is turnable with reference to the corresponding race, said wearing strips contacting the corresponding races along lines spaced angularly through 90 degrees with reference to each other; and a plurality of rolling elements disposed between said wearing strips.

2. An antifriction bearing as set forth in claim 1, wherein the cross-sectional area of each wearing strip corresponds to the area surrounded by one-half of a circle.

3. An antifriction bearing, comprising a pair of annular races each having two annular faces and each face of one race being adjacent to but spaced from one face of the other race, each of said faces having an annular groove located opposite the groove in the adjacent face; an annular wearing strip angularly movably received in each of said grooves; and two groups of rolling elements, each group of said rolling elements being disposed between two adjacent wearing strips and each rolling element being in linear contact with the corresponding pair of wearing strips.

4. An antifriction bearing, comprising a pair of coaxial races having adjacent but spaced annular surfaces each provided with an annular groove of substantially rectangular cross-sectional outline and having two rounded corner portions; a pair of annular wearing strips angularly movably received in each of said grooves, each wearing strip having an outer surface of substantially semicircular cross-sectional outline extending into one of said corner portions and each of said wearing strips having a flat inner surface parallel with the inner surface of a wearing strip in the groove of the other race so that said wearing strips together define an annular raceway of rectangular cross-sectional outline; and a plurality of cylindrical rolling elements provided in said raceway, each of said rolling elements being in linear contact with the inner surfaces of at least two wearing strips.

5. An antifriction bearing as set forth in claim 4, wherein the axes of said rolling elements are inclined with reference to the common axis of said races.

References Cited
UNITED STATES PATENTS

| | | | |
|---|---|---|---|
| 1,094,312 | 4/1914 | Delmez | 308—194 |
| 1,262,208 | 4/1918 | Kelly | 308—194 |
| 1,928,114 | 9/1933 | Scheffler | 308—194 |
| 2,030,151 | 2/1936 | Oelkers | 308—194 |

FOREIGN PATENTS

| | | |
|---|---|---|
| 540,641 | 4/1922 | France. |

MARTIN P. SCHWADRON, *Primary Examiner.*

FRANK SUSKO, *Examiner.*